United States Patent [19]

Yokomatsu et al.

[11] Patent Number: 4,906,028
[45] Date of Patent: Mar. 6, 1990

[54] HOSE CONNECTION ASSEMBLY

[75] Inventors: Takahiro Yokomatsu; Kenji Mine; Shinichiro Kato, all of Tokyo, Japan

[73] Assignee: Bridgestone Flowtech Corporation, Tokyo, Japan

[21] Appl. No.: 294,680

[22] Filed: Jan. 9, 1989

Related U.S. Application Data

[62] Division of Ser. No. 249,295, Sep. 26, 1988.

[30] Foreign Application Priority Data

Mar. 8, 1988 [JP] Japan .................................. 63-55390

[51] Int. Cl.⁴ ............................................. F16L 17/04
[52] U.S. Cl. ................................. 285/101; 285/243; 285/255; 285/259; 285/323
[58] Field of Search ............... 285/323, 101, 104, 105, 285/100, 113, 343, 243, 255, 259

[56] References Cited

U.S. PATENT DOCUMENTS

| | | | |
|---|---|---|---|
| 2,466,526 | 4/1949 | Wolfram | 285/104 |
| 3,409,314 | 11/1968 | Roe | 285/105 X |
| 3,999,783 | 12/1976 | Legris | 285/243 X |
| 4,157,843 | 6/1979 | Trnka | 285/259 X |
| 4,229,029 | 10/1980 | Boyer et al. | 285/323 X |
| 4,431,216 | 2/1984 | Legris | 285/323 X |
| 4,445,714 | 5/1984 | Kisiel, III | 285/323 X |
| 4,775,171 | 10/1988 | Marshall | 285/101 |

FOREIGN PATENT DOCUMENTS

| | | | |
|---|---|---|---|
| 406205 | 3/1946 | Italy | 285/323 |
| 520608 | 4/1957 | Italy | 285/343 |
| 678423 | 10/1964 | Italy | 285/343 |
| 495698 | 11/1938 | United Kingdom | 285/323 |

Primary Examiner—Thomas F. Callaghan
Attorney, Agent, or Firm—Lane & Aitken

[57] ABSTRACT

A hose fitting for connecting a hydraulic hose to a hydraulic system including an axially inner reduced diameter bore portion and an axially outer enlarged diameter bore portion formed with an inner circumferential groove, comprising: a cylindrical member axially slidable within the enlarged diameter bore portion and having a radial flange portion and an axial tubular portion extending axially outwardly from the radial flange portion; a collet having an outer surface; a sleeve arranged between the cylindrical member and the collet and having an inner inclined surface engageable with the outer surface of the collet, the collet being radially inwardly constrictible when the sleeve is moving axially outwardly, the hydraulic hose being crimped by axial outward movement of the sleeve; and a stop member received in the circumferential groove and adapted to limit axial outward movement of the sleeve and collet.

5 Claims, 4 Drawing Sheets 4,906,028

HOSE CONNECTION ASSEMBLY

FIELD OF THE INVENTION

The present invention relates in general to hose connection assemblies, and in particular to such assemblies which are employed to connect hydraulic hoses to hydraulic systems such as hydraulic pumps, hydraulic valves and the like.

The invention especially relates to an improved hose connection assembly which connects hydraulic hoses to hydraulic systems without screw connection.

DESCRIPTION OF THE PRIOR ART

A conventional hose connection assembly for hydraulic systems is shown in FIGS. 7 and 8 for instance. In the hose connection assembly 1 as shown in FIG. 7, a hydraulic system 2 such as a hydraulic pump uses high-pressure fluid having a normal fluid pressure of more than 30 kg/cm$^2$ and has a fluid passageway 2a' through which fluid under pressure passes. In the connection of a hydraulic hose 3 to the hydraulic system 2, the hydraulic hose 3 is connected to a hose fitting 7 and then connected to a connection portion 2b formed in a wall 2a of the hydraulic system 2. The hydraulic hose 3 comprises, as shown in FIG. 8, plural layers formed by an inner tube 4, an intermediate reinforcing layer 5 and an outer cover 6. There are two kinds of hose fittings used in the connection of such a hydraulic hose thereto; one is a crimping type as shown in FIG. 8 and another is a noncrimping type. The hose fitting 7 of the crimping type comprises a core member 8 having a pipe taper thread 7a for connecting the core member 8 to the hydraulic system 2, and a cylindrical crimping member 9 retained on the core member 8. The hydraulic hose 3 is inserted on the axial tubular portion 8a of the core member 8, and the cylindrical member 9 is crimped by suitable crimping machines. The pipe taper thread 7a of the tube fitting 7 is then covered with a sealing member and threaded into the female thread formed in the connection portion 2b of the hydraulic system 2. A hose fitting 11 as shown in FIG. 9 uses a pipe parallel thread 11a with an O-ring 12 mounted thereon instead of the aforesaid pipe taper thread 7a, and connects the hydraulic hose 3 to the hydraulic system 2. Thus, in the connection of a hydraulic hose to a hydraulic system, the hydraulic hose is normally connected to the hydraulic system through screw connection, i.e., by the use of male and female threads.

However, the screw connection has presented drawbacks that threading tools are required in the case of a hose fitting having no thread thereon and that time and effort is required in threading the male thread of the hose fitting into the female thread of the hydraulic system. For this reason, it has been eagerly demanded to make it possible to connect a hydraulic hose to a hydraulic system without screw connection. Furthermore, in the case that one end of an adapter is first threaded into the female thread formed in the wall 2a of the hydraulic system 2 and then the hose fitting 7 is connected to the other end of the adapter, the screw connection is difficult in a narrow place as the adapter and hose fitting 7 protrude largely from the wall 2a of the hydraulic system 2 as shown in FIG. 7. In addition, the hose end cannot be bent in the vicinity of the hydraulic system wall 2a.

Accordingly, it is the object of the present invention to provide an improved hose connection assembly which can eliminate the drawbacks mentioned above and wherein a hydraulic hose is very easily connected to a hydraulic system without screw connection.

SUMMARY OF THE INVENTION

In accordance with an important aspect of the present invention, there is provided a hose fitting for connecting a hydraulic hose to a hydraulic system including a wall member which has an axially inner reduced diameter bore portion formed with a reduced diameter bore and an axially outer enlarged diameter bore portion formed with an inner circumferential groove and an enlarged diameter bore connected to the reduced diameter bore, comprising: a cylindrical member axially slidable within the enlarged diameter bore portion of the hydraulic system and having a radial flange portion and an axial tubular portion extending axially outwardly from the radial flange portion, the axial tubular portion being formed with a through bore communicating with the axial reduced bore of the reduced diameter bore portion of the hydraulic system; a collet having an outer inclined surface, and a radial flange portion radially outwardly extending from the outer surface and received in the inner circumferential groove of the hydraulic system; a sleeve arranged between the cylindrical member and the collet and axially movable within the enlarged diameter bore portion of the hydraulic system, the sleeve having an inner inclined surface engageable with the outer surface of the collet, the collet being radially inwardly constrictible when the sleeve is moving axially outwardly, the hydraulic hose being crimped between the collet and the axial tubular portion of the cylindrical member by axial outward movement of the sleeve; and a stop member received in the circumferential groove of the enlarged diameter bore portion and adapted to limit axial outward movement of the sleeve and collet.

BRIEF DESCRIPTION OF THE DRAWINGS

The above and other objects and advantages will become apparent from the following detailed description when read in conjunction with the accompanying drawings wherein.

DESCRIPTION OF THE PREFERRED EMBODIMENTS

Figure 1:
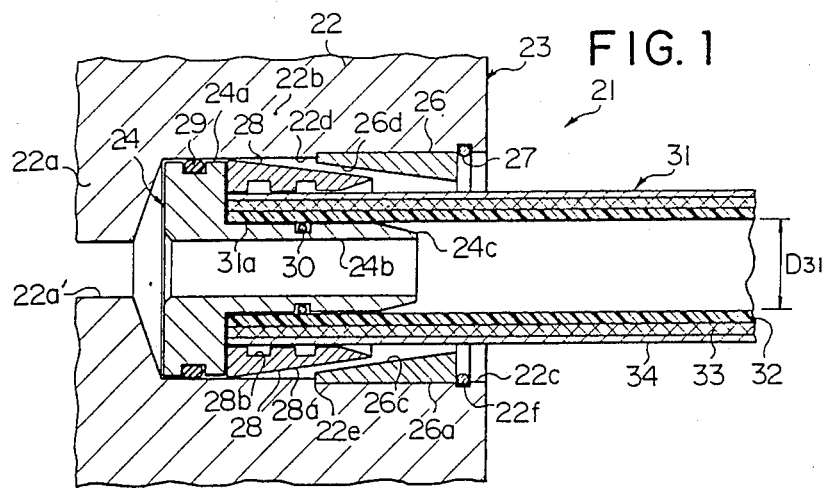
FIG. 1 is a longitudinal cross-sectional view showing a hose connection assembly constructed in accordance with a first embodiment of the present invention.
Figure 3:
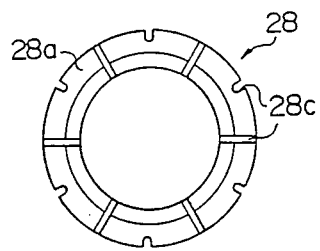
FIG. 3 is an end view showing the collet of FIG. 1.
Figure 4:
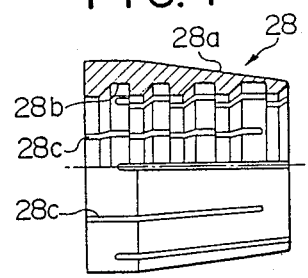
FIG. 4 is a side view, partly in section and partly in elevation, showing the collet shown in FIG. 3.

Referring more particularly to the drawings where the showings are for the purpose of illustrating preferred embodiments of the present invention only and not for the purpose of limiting same, FIG. 1 shows the present invention incorporated in a hose connection assembly 21. The hose connection assembly 21 comprises a core member 24 that is connected to a hydraulic system 23 such as hydraulic pumps, hydraulic valves and the like. The hydraulic system 23 includes a wall member 22 which has an axially inner reduced diameter bore portion 22a formed with a reduced diameter bore 22a' and which further has an axially outer enlarged diameter bore portion 22b formed with an enlarged diameter bore 22d connected to the reduced diameter bore 22a'. The core member 24 of the hose connection assembly 21 has a radial flange portion 24a axially slidable within the bore 22d of the enlarged diameter bore portion 22b, and an axial tubular portion 24c extending axially outwardly from the radial flange portion 24a and formed with an axial through bore 24b communicating with the bore 22a' of the reduced diameter bore portion 22a. It is preferred that the axial tubular portion 24c of the core member 24 be covered with a sealing member in order to provide better engagement of the tubular portion with a hydraulic hose to be described hereinafter. The enlarged diameter bore portion 22b of the hydraulic system 23 is provided at its axially outer end portion 22c with a cylindrical retaining sleeve 26. The cylindrical sleeve 26 has its outer surface 26a received in a recess 22e in the enlarged diameter bore portion 22b, and the axial movement of the cylindrical sleeve 26 is limited by an annular stop ring 27 received in a circumferential groove 22f in the enlarged diameter bore portion 22b. The cylindrical sleeve 26 has a radially inner frustoconical surface 26c narrowing toward the axially outer end portion 22c of the enlarged diameter bore portion 22b. A cylindrical collet 28 made of steel is provided within the enlarged diameter bore portion 22b of the hydraulic system 23, and has a radially outer frustoconical surface 28a narrowing toward the axially outer end portion 22c of the enlarged diameter bore portion 22b at an angle corresponding to the angle of the inner frustoconical surface 26c of the sleeve 26. It is noted that the collet 28 also may be made of polyacetal and synthetic resin such nylon and the like. The collet 28 is formed at its inner surface with a plurality of circumferential groove and land portions 28b, so that it can effectively constrict radially inwardly when axially outwardly moving within the sleeve 26. As shown in FIGS. 3 and 4, the collet 28 is further formed with a plurality of axial slits 28c so that the collet 28 can maintain its form and surely constrict radially inwardly even under constricting and crimping load. A first O-ring 29 is received in a circumferential groove formed in the radial flange portion 24a of the core member 24 to form a seal between the enlarged diameter bore portion 22b of the hydraulic system 23 and the flange portion 24a of the core member 24. A second O-ring 30 is received in a circumferential groove formed in the axial tubular portion 24c of the core member 24 in opposing relationship to the circumferential groove and land portions 28b of the collet 28, and is adapted to form a seal between the axial tubular portion 24c and a hydraulic hose 31 inserted on the axial tubular portion 24c.

Figure 2:
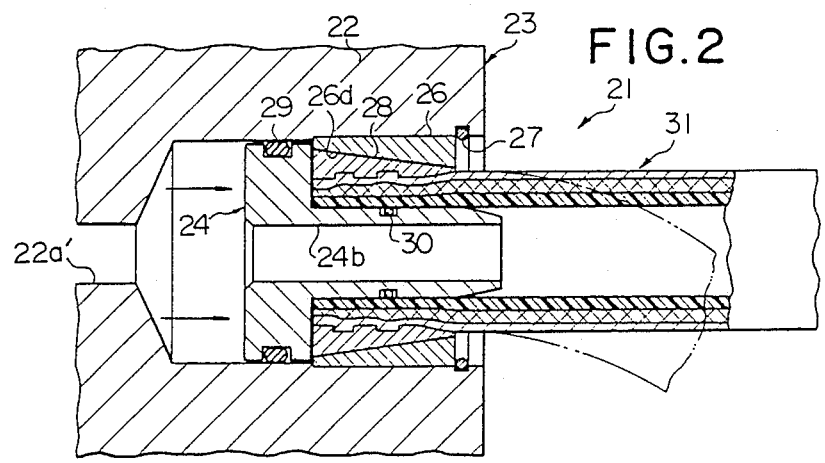
FIG. 2 is a view similar to FIG. 1 showing the hose connection assembly wherein the hose is crimped and connected to the hydraulic system by axial outward movement of the core member from the position of FIG. 1.

The hydraulic hose 31 is a high-pressure hose of a composite construction having an inner diameter $D_{31}$ of 9.5 mm., and comprises an inner tube 32 made of nylon resin, an intermediate reinforcing braided layer 33 made of polyester fiber, and an outer cover 34 made of polyurethan. The distal end 31a of the hydraulic hose 31 passes axially inwardly and is inserted to the fully inserted position of FIG. 1 wherein the end 31a abuts the flange portion 24a of the core member 24. If an internal pressure is applied through the bore 22a' to the axially inner end surface of the core member 24, the core member 24 is caused to move axially outwardly toward the sleeve 26. As shown in FIG. 2, the axial outward movement of the core member 24 from the fully inserted position of FIG. 1 now causes the collet 28 to be moved axially outwardly so as to bring the outer frustoconical surface 28a of the collet 28 into engagement with the inner frustoconical surface 26c of the sleeve 26. As a result of the movement of the collet 28, the collet 28 is constricted radially inwardly so that the hydraulic hose 31 is crimped between the collet 28 and the axial tubular portion 24c of the core member 24.

The operation of the hose connection assembly 21 constructed as described above will hereinafter be described in detail.

The hydraulic hose 31 is first inserted to the fully inserted position of FIG. 1 wherein the distal end 31a abuts the flange portion 24a of the core member 24. The inner tube 32 of the hydraulic hose 31 engages the O-ring 30 in the axial tubular portion 24b of the core member 24 and thereby forms a seal between the inner tube 32 of the hydraulic hose 31 and the tubular portion 24b, and even in the case of zero pressure or substantially zero pressure within the hose connection assembly 21, there is no leak of fluid. As the hose connection assembly 21 of the present invention has within the enlarged diameter bore portion 22b of the hydraulic system 23 the sleeve 26 and the collet 28, when internal pressure is applied to the hose connection assembly 21, the flange portion 24a of the core member 24 is caused to move axially outwardly toward the sleeve 26 due to the internal pressure within the reduced diameter bore portion 22a, and at the same time the collet 28 is engaged by the core member 24 and moves axially outwardly with the core member 24. As a result of the movement of the collet 28 from the position of FIG. 1 to the position of FIG. 2, the outer frustoconical surface 28a of the collet 28 is brought into engagement with the inner frustoconical surface 26c of the sleeve 26 and axially slides within the sleeve 26. When this occurring, the axial slits 28c of the collet 28 are caused to be narrowed and the collet 28 is caused to be constricted radially inwardly, while at the same time the outer cover 34 of the hydraulic hose 31 is crimped by the circumferential groove and land portions 28b of the collet 28. In this way, the hydraulic hose 31 is firmly crimped by the hose connection assembly 21, and therefore there is no leak of the fluid within the hose connection assembly 21. In addition, as the diameter of the maximum diameter portion 26d of the sleeve 26 is slightly smaller than the outer diameter of the flange portion 24a of the core member 24, the collet 28 is retained at the maximum diameter portion 26d at a predetermined internal pressure. For this reason, the hydraulic hose 31 is not excessively crimped by the collet 28 and the core member 24, and therefore the outer cover 34 and the intermediate reinforcing layer 33 are effectively prevented from being cut. The hydraulic hose 31 is simply inserted between the collet 28 and the core member 24 as arranged in FIG. 1 and is connected to the wall member 22 of the hydraulic system 23 with the axial outward movement of the hydraulic hose 31 from the position of FIG. 1 to the position of FIG. 2 as described above. Thus, the hose connection assembly 21 according to the present invention requires no crimping tools in the connection of the hydraulic hose 31 to the hydraulic system 23, and therefore the hose end can be very easily connected to the hydraulic system 23 without the use of screws.

In addition, since the distal end 31a of the hydraulic hose 31 is inserted into the wall member 22 of the hydraulic system 23 and connected to the hydraulic system 23 with the axial outward movement of the hydraulic hose 31 from the position of FIG. 1 to the position of FIG. 2, there is no fittings protruding axially outwardly from the outer wall surface of the wall member 22. Thus, the hydraulic hose 31 is capable of being bent at the outer wall surface of the wall member 22 as indicated by broken lines in FIG. 2, and therefore the hydraulic hose 31 can be connected to the hydraulic system 23 even in narrow working space.

Figure 5:
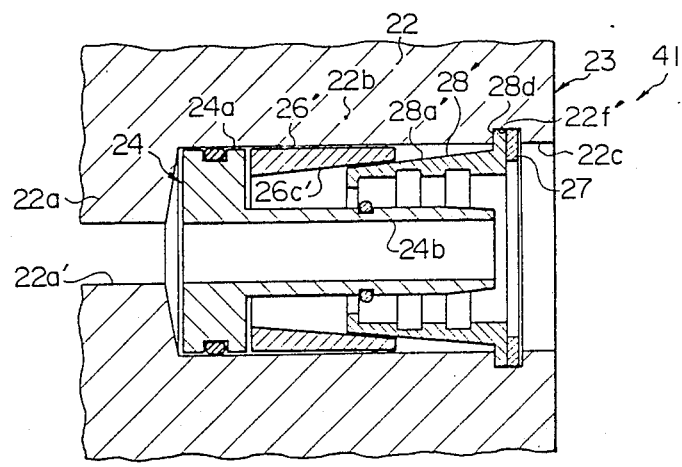
FIG. 5 is a longitudinal cross-sectional view showing a hose connection assembly constructed in accordance with a second embodiment of the present invention.
Figure 6:
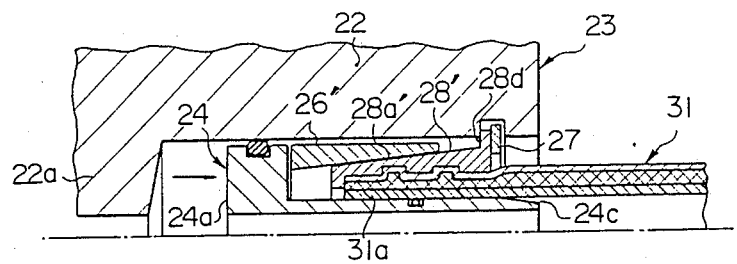
FIG. 6 is a longitudinal cross-sectional view, partly broken away, showing the hose connection assembly wherein the hose is crimped and connected to the hydraulic system by axial outward movement of the core member from the position of FIG. 5.
Figure 7:
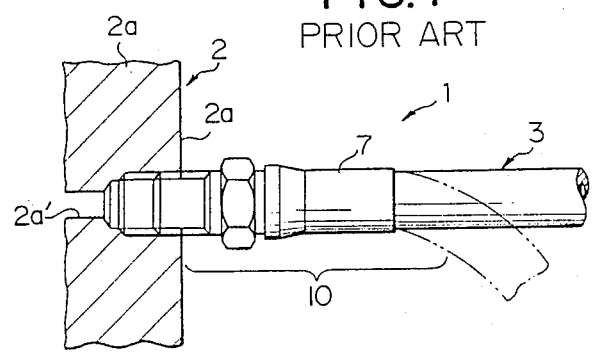
FIG. 7 is a schematic view, partly broken away, showing a conventional hose connection assembly.
Figure 8:
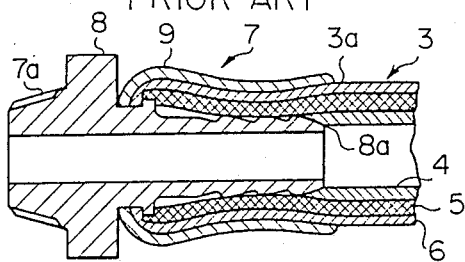
FIG. 8 is an enlarged longitudinal cross-sectional view showing the hose fitting of FIG. 7.
Figure 9:
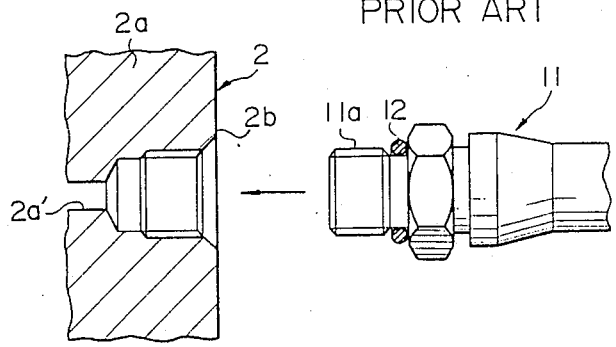
FIG. 9 is a schematic view, partly broken away, showing another conventional hose connection assembly.

FIG. 5 illustrates a hose connection assembly 41 constructed in accordance with a second embodiment of the present invention. The parts and members substantially identical to those of the first embodiment shown in FIGS. 1 and 2 are designated by like reference numerals for avoiding the detailed description. The second embodiment shown in FIG. 5 is characterized in that a collet 28' is mounted in the enlarged diameter bore portion 22b of a hydraulic system 23 and that a sleeve 26' is arranged between a core member 24 and the collet 28' and axially movable. The collet 28' has a radially outer frustoconical surface 28a' widening axially outwardly, and a radial flange portion 28d which is snugly received in a circumferential groove 22f in the enlarge diameter bore portion 22b. The axial outward movement of the collet 28' is limited by an annular stop ring 27 also snugly received in the circumferential groove 22f. The sleeve 26' has a radially inner frustoconical surface 26c' widening axially outwardly at an angle corresponding to the angle of the frustoconical surface 28a' of the collet 28'. As shown in FIG. 6, the internal pressure within an axially inner reduced diameter bore portion 22a causes the flange portion 24a of the core member 24 to move axially outwardly toward the sleeve 26. The sleeve 26' engaged by the flange portion 24a is then moved axially outwardly so as to bring the inner frustoconical surface 26c' of the sleeve 26' into engagement with the frustoconical surface 28a' of the collet 28'. As a result, the collet 28' is constricted radially inwardly, and thus the distal end 31a of the hydraulic hose 31 is firmly crimped between the collet 28' and the axial tubular portion 24c of the core member 24, thereby completing the connection of the hydraulic hose 31 to the hydraulic system 23.

From the foregoing description, it will be seen that in accordance with the present invention, there is provided an improved hose connection assembly which can eliminate the drawbacks mentioned above and wherein a hydraulic hose is very easily connected to a hydraulic system without screw connection. While certain representative embodiments and details have been shown for the purpose of illustrating the invention, it will be apparent to those skilled in this art that various changes and modifications may be made therein without departing from the scope of the invention.

What we claim is:

1. A hose fitting for connecting a hydraulic hose to a hydraulic system including a wall member which has an axially inner reduced diameter bore portion formed with a reduced diameter bore and an axially outer enlarged diameter bore portion formed with an inner circumferential groove and an enlarged diameter bore connected to the reduced diameter bore, comprising:

a cylindrical member axially slidable within said enlarged diameter bore portion of said hydraulic system and having a radial flange portion and an axial tubular portion extending axially outwardly from said radial flange portion, the axial tubular portion being formed with a through bore communicating with said axial reduced bore of said reduced diameter bore portion of said hydraulic system;

a collet having an outer surface, and a radial flange portion radially outwardly extending from said outer surface and received in said inner circumferential groove of said hydraulic system;

a sleeve arranged between said cylindrical member and said collet and axially movable within said enlarged diameter bore portion of said hydraulic system, the sleeve having an inner inclined surface engageable with said outer surface of said collet, the collet being radially inwardly constrictible when said sleeve is moving axially outwardly, the hydraulic hose being crimped between said collet and said axial tubular portion of said cylindrical member by axial outward movement of said sleeve; and a stop member received in said circumferential groove of said enlarged diameter bore portion and adapted to limit axial outward movement of said sleeve and collet.

2. A hose fitting as set forth in claim 1, wherein said radial flange portion and axial tubular portion of said cylindrical member are provided with sealing members, respectively.

3. A hose fitting as set forth in claim 1, wherein said inner inclined surface of said sleeve widens axially outwardly and said outer surface of said collet widens axially outwardly.

4. A hose fitting as set forth in claim 3, wherein said inner inclined surface of said sleeve widens at an angle corresponding to the angle of said outer surface of the collet.

5. A hose fitting as set forth in claim 1, wherein said collet is formed at its inner surface with a plurality of circumferential groove and land portions and at its outer surface with a plurality of axial slits.

* * * * *